May 31, 1932.   J. BETHUNE   1,861,258
GEARING
Filed Nov. 17, 1930
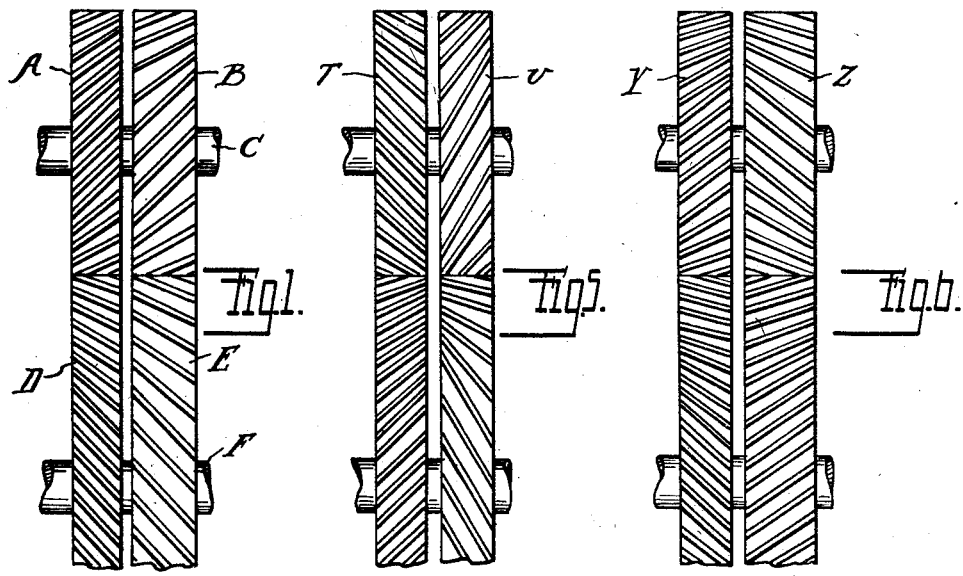
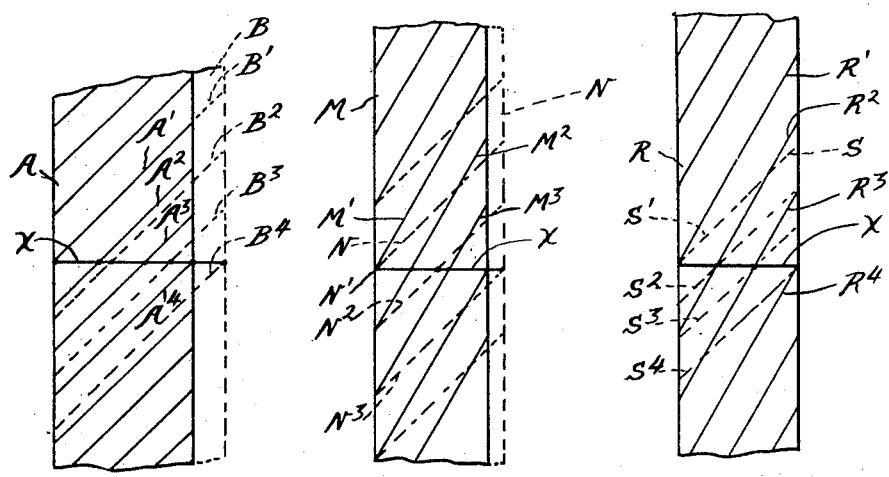
INVENTOR
John Bethune
BY Whittemore Hulbert Whittemore & Belknap   ATTORNEYS Patented May 31, 1932

1,861,258

UNITED STATES PATENT OFFICE

JOHN BETHUNE, OF ROCHESTER, NEW YORK, ASSIGNOR TO REO MOTOR CAR COMPANY, OF LANSING, MICHIGAN, A CORPORATION OF MICHIGAN

GEARING

Application filed November 17, 1930. Serial No. 496,263.

The invention relates to power transmission gearing and more particularly to that type in which the power is transmitted through a plurality of loaded gear trains having noise reducing differential characteristics. The present invention relates to a particular construction of this type, viz: one in which the teeth of the two trains have such differential characteristics as result in an equal overlap of teeth. The invention therefore consists in the construction as hereinafter set forth.

In the drawings:

Figure 1 is a side elevation of a power transmission gearing embodying my invention;

Figure 2 is a diagrammatic view showing superposed plane developments of the two adjacent gears;

Figure 3 is a diagrammatic view similar to Figure 2 in which the two gears have different helical angles, different width, and equal overlap;

Figure 4 is another diagrammatic view in which the two gears have the same width, different circular pitch and different helical angle;

Figure 5 is an elevation of a modified form of gearing in which the two gears have oppositely inclined teeth, the tooth characteristics being otherwise similar to those diagrammatically illustrated in Figure 3;

Figure 6 represents a modified form of gearing in which the two gears have different normal pitch, different helical angle, different numbers of teeth and different widths of face.

It is well known in the gear art that where gears are running at a relatively high peripheral speed there is developed a sound or tone which rises in pitch as the speed is increased. It is also a fact that gears of different characteristics such as differences in circular pitch or in angle of teeth have individual tone producing qualities. I have discovered that where the power is transmitted through a plurality of gear trains having differential characteristics the sound produced is lessened, probably through interference between vibrations of different frequencies having a neutralizing effect on each other. Whether or not this is the true theory, it is a demonstrated fact that with such constructions noise production is lessened.

With the particular type of construction forming the subject matter of the present application the differential characteristics are such as to produce an equal overlap of the teeth in the two gear trains. Thus, as shown in Figure 1, A and B are two gears mounted on the common shaft C, and D and E are the mating gears mounted on the shaft F. The two trains are of equal ratio and the teeth in each train are helical and inclined in the same general direction. The gear B is substantially wider than the gear A and the circular pitch of the gear B is different than the circular pitch of the gear A, there being fewer teeth on the gear B than the gear A.

Figure 2 shows the plane developments of the gears A and B superposed one on the other with the teeth A' and B' of the respective gears co-incident. The series of teeth on the gear A are represented by A', $A^2$, $A^3$, $A^4$, etc., while the teeth on the gear B are represented by B', $B^2$, $B^3$, $B^4$, etc. X represents the line of intersection of the meshing gears and it will be noted that this line intercepts the teeth A', $A^2$, $A^3$ and $A^4$. The same line intercepts within the boundaries of the gear A the teeth B', $B^2$ and $B^3$ but in order to intercept an equal number of teeth the line X must be prolonged to the extreme width of the gear B thereby intercepting the tooth $B^4$. Thus, with the gears A and B of differential width as shown, the line X intercepts the same number of teeth in each gear and the gears are of equal overlap.

It will be understood that in carrying my invention into effect, it is not necessary to have gears of as great width with respect to circular pitch as shown in Figure 2, this being exaggerated in the diagram to more clearly illustrate the principle of overlapping. However, the same proportional width of the gears A and B must be maintained with the differential circular pitches illustrated.

In Figure 3 is diagrammatically represented gearing in which the helical angle of the gears is different in the two trains and the widths are also different. In this figure the gears M and N replace the gears A and B and the helical angle of the gear M is shown as greater than the helical angle of the gear N. It will be noted that the line X intercepts the gear teeth M', M² and M³ of the gear M and the teeth N', N² and N³ of the gear N but to intercept this same number of teeth it is necessary that the gear N be of greater width than the gear M.

The modification illustrated in Figure 4 shows the gears R and S of equal width and having teeth of equal overlap. In this case both the circular pitch and helical angle of the respective gears R and S are different. It will be noted that the line X intercepts the teeth R', R², R³ and R⁴ in the same points as it intercepts the teeth S', S², S³ and S⁴. These two gears therefore have differential pitch, differential helical angle and equal overlap.

Figure 5 shows an elevation of gearing constructed in accordance with the same principles illustrated in Figure 4 with the exception that the teeth on the two gears are inclined at opposite helical angles, thus forming a herringbone gear. In this figure the gears T and U replace the gears R and S.

Figure 6 shows a further modification of the gearing in which the gears Y and Z have different normal pitch, different helical angle and different face widths. A practical example of this type of gearing is as follows: Gear Y has 43 teeth, 16 normal pitch, width of face .625 inches, and helical angle 39 degrees 50 minutes. The gear Z has 32 teeth, 12 normal pitch, face width .800 inches, and helical angle 40 degrees 22 minutes. Gears constructed in accordance with these specifications have approximately 2 teeth in contact at all times.

In each of the constructions illustrated above the same principle is disclosed, namely, the provision of gears in the equal ratio gear trains of differential characteristics but the same overlap. It has been found advantageous to maintain a constant overlap in order to still more effectively reduce the noise of operation of transmission gearing in which the two gear trains have noise-reducing differential characteristics.

What I claim as my invention is:

1. The combination with a rotary drive member and a rotary driven member, of a gear train therebetween having a plurality of equal ratio simultaneously loaded gear train portions between said members, said gear train portions having noise-reducing differential characteristics and equal overlap of teeth.

2. The combination with a rotary drive member and a rotary driven member, of a gear train therebetween having a plurality of equal ratio simultaneously loaded gear train portions between said members, said gear train portions having different pitch and equal overlap of teeth.

3. The combination with a rotary drive member and a rotary driven member, of a gear train therebetween having a plurality of equal ratio simultaneously loaded gear train portions between said members, said gear train portions having different helical angle and equal overlap of teeth.

4. The combination with a rotary drive member and a rotary driven member, of a gear train therebetween having a plurality of equal ratio simultaneously loaded gear train portions between said members, said gear train portions having different pitch, different gear widths and equal overlap of teeth.

5. The combination with a rotary drive member and a rotary driven member, of a gear train therebetween having a plurality of equal ratio simultaneously loaded gear train portions between said members, said gear train portions having different helical angle, different gear widths and equal overlap of teeth.

6. The combination with a rotary drive member and a rotary driven member, of a gear train therebetween having a plurality of equal ratio simultaneously loaded gear train portions between said members, said gear train portions having the same width, different pitch, different helical angle and equal overlap of teeth.

7. The combination with a rotary drive member and a rotary driven member, of a gear train therebetween having a plurality of equal ratio simultaneously loaded gear train portions between said members, said gear train portions having different normal pitch, different helical angle, different width and equal overlap of teeth.

8. A composite gear comprising two coaxial helical gears, one gear having 43 teeth, 16 normal pitch and helical angle 39 degrees 50 minutes and the other gear having 32 teeth, 12 normal pitch and helical angle 40 degrees 22 minutes, said gears having different face widths such as to obtain approximately the same tooth overlap in each gear.

9. A composite gear comprising two coaxial helical gears, one gear having 43 teeth, 16 normal pitch and helical angle 39 degrees 50 minutes and the other gear having 32 teeth, 12 normal pitch and helical angle 40 degrees 22 minutes, said gears having different face widths in the proportion of .625 inches width of the 43 tooth gear and .800 inches width of the 32 tooth gear.

10. The combination with a rotary drive member and a rotary driven member, of a gear train therebetween having a plurality of equal ratio simultaneously loaded gear train portions between said members, said gear train portions being oppositely inclined and having different normal pitch, different helical angle, different width and equal overlap of teeth.

11. The combination with a rotary drive member and a rotary driven member, of a gear train therebetween having a plurality of equal ratio simultaneously loaded gear train portions between said members, said gear train portions having equal overlap of teeth and having noise-reducing differential characteristics of the class comprising different helical angles, different face width, or different pitches.

In testimony whereof I affix my signature.

JOHN BETHUNE.